Patented June 24, 1941

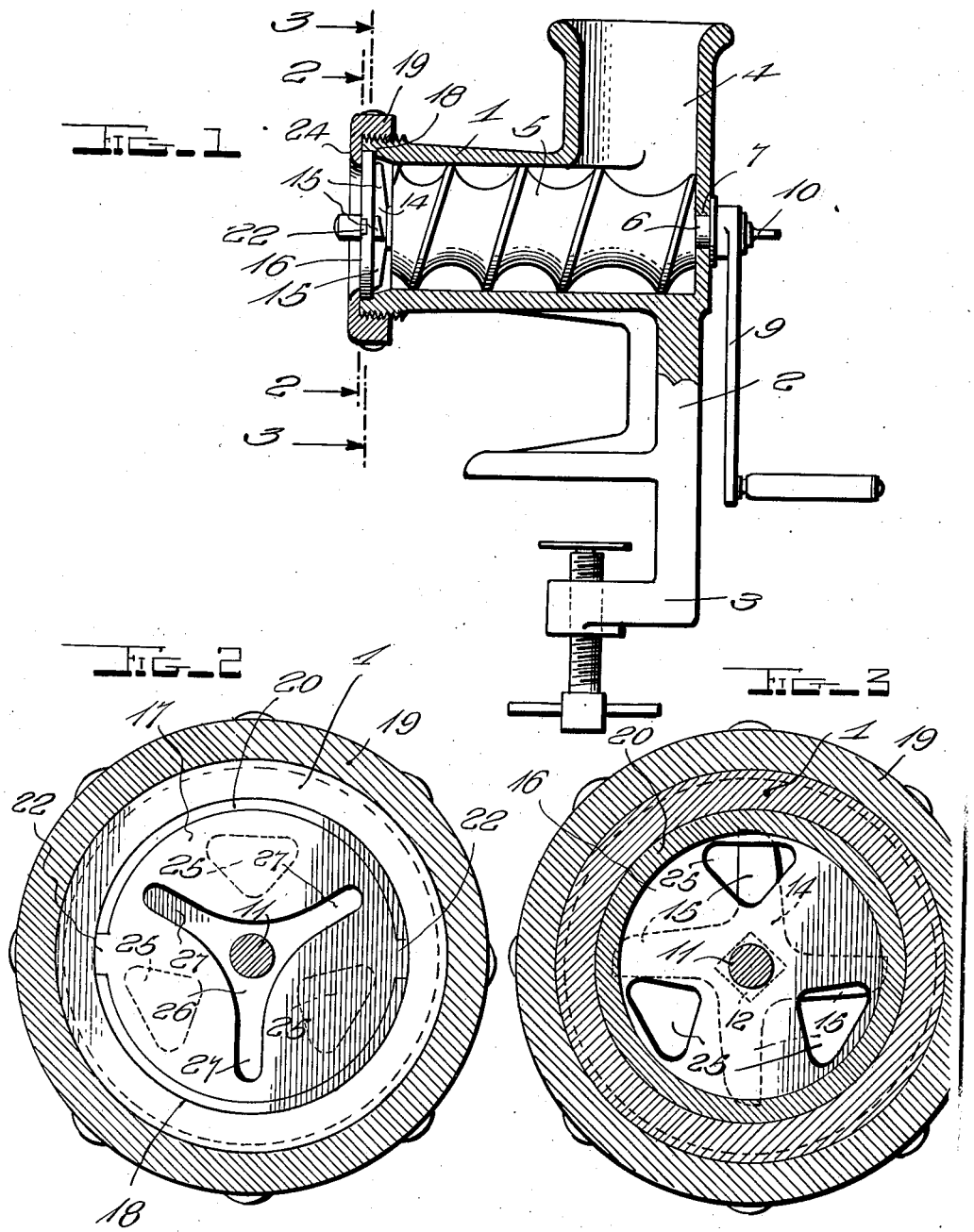

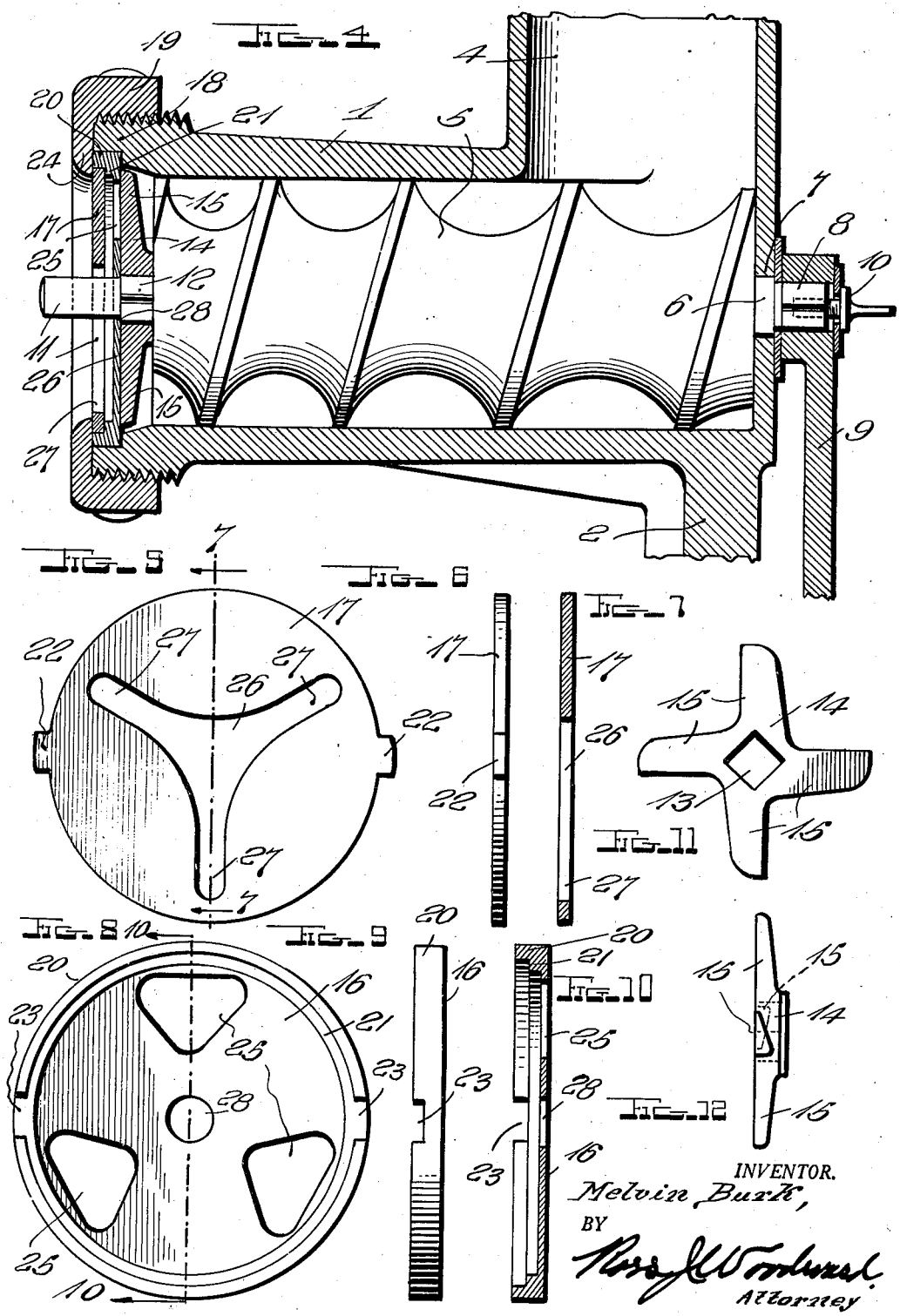

2,247,012

UNITED STATES PATENT OFFICE 2,247,012

MEAT GRINDER

Melvin Burk, Akron, Ohio

Application January 17, 1940, Serial No. 314,326

7 Claims. (Cl. 146—189)

This invention relates to meat grinders and it is one object of the invention to provide a meat grinder having means at the front of its barrel for slicing meat as the meat is advanced forwardly by the feed screw, other means being associated with the slicing means for gauging the thickness of the meat as it is sliced and thus causing sliced meat of the desired thickness to be delivered from the grinder.

Another object of the invention is to provide the meat grinder with plates so mounted at the front end of the barrel that they will be firmly held in place in proper spaced relation to each other and prevented from having movement relative to each other when the grinder is in use.

Another object of the invention is to so mount the plates that while they will be firmly held in place in operative relation to each other, they may be easily removed from the grinder barrel and taken apart for thorough cleaning after a sufficient quantity of meat has been ground.

Another object of the invention is to so form and mount the plates that the outer plate may serve as a shield to prevent a person's fingers from being accidentally thrust through openings in the inner plate and cut off by the rotary cutter.

Another object of the invention is to provide a meat grinder wherein the meat is so acted upon as it passes through and from the barrel that it is discharged as tenderized meat of predetermined thickness instead of as a mass of ground meat of the type known as hamburger.

The invention is illustrated in the accompanying drawings, wherein:

Fig. 1 is a view showing a meat grinder of the improved construction partially in vertical longitudinal section and partially in side elevation.

Fig. 2 is a transverse sectional view on an enlarged scale, on the line 2—2 of Fig. 1.

Fig. 3 is a similar view taken on the line 3—3 of Fig. 1.

Fig. 4 is a fragmentary view similar to Fig. 1, on an enlarged scale.

Fig. 5 is a face view of the outer plate.

Fig. 6 is an edge view thereof.

Fig. 7 is a sectional view taken on the line 7—7 of Fig. 5.

Fig. 8 is a view looking at the outer face of the inner plate.

Fig. 9 is an edge view of the inner plate.

Fig. 10 is a sectional view on the line 10—10 of Fig. 8.

Fig. 11 is a face view of the cutter.

Fig. 12 is an edge view of the cutter.

This meat grinder has a barrel 1 which may be of any desired length and diameter and carries a depending shank 2 formed with a clamp 3 by means of which the grinder may be removably mounted on a table or other support for use. A mouth 4 extends upwardly from the rear end of the barrel and through this mouth meat is fed into the barrel.

A feed screw 5 extends longitudinally in the barrel and at its rear end is provided with a stub shaft 6 which passes through an opening 7 formed in the rear end of the barrel axially thereof and is formed with a squared outer end portion 8 upon which the handle 9 is removably secured by a thumb screw 10. The feed screw is also provided at its front end with a stub shaft 11 having a squared inner or rear end portion 12 for engaging through the square opening 13 of the cutter 14. This cutter has a number of blades 15 which extend radially from its hub and are sharpened along their edges so that as the screw is turned, and the cutter turns with it, slicing action will take place. The outer face of the cutter is flat, as shown in Figs. 1, 4 and 12, and the blades gradually decrease in thickness from the hub of the cutter toward their outer free ends.

In order that the meat may be cut to form slices of predetermined thickness as it is advanced through the barrel by the screw, there have been provided inner and outer plates 16 and 17 removably held in an annular seat 18 at the front end of the barrel by a securing ring 19, the ring being threaded on the externally thickened and threaded forward portion of the barrel. The inner plate 16 has its marginal portions thickened to form a forwardly projecting circumferentially extending flange 20 and an annular shoulder 21 spaced from the outer end of the flange a distance corresponding to the thickness of the outer plate so that when the outer plate is set in place against the shoulder, its outer face will be flush with the outer edge face of the flange. Lugs 22 extend radially from the outer plate and engage in recesses or seats 23 formed in the flange 20. While two lugs have been shown, it will be understood that any number of lugs and a corresponding number of seats may be provided. Since the flange 24 of the ring 19 overlaps the flange 20 and the tongues or lugs 22, the two plates 16 and 17 will be firmly held in place and prevented from moving out of proper relation to each other. A number of openings 25, which have been shown triangular but could be any desired shape and have rounded corner portions, are formed through the inner plate and the outer plate is formed with a center opening 26 having arms or extensions 27 projecting radially of the plate between the openings of the inner plate. The inner plate is also formed with a center opening 28 to accommodate the stub shaft 11 which projects forwardly through the center of the opening 26 of the outer plate, as shown in Figs. 1 and 4.

When this meat grinder is in use, it is assembled as shown in Figs. 1 and 4, and mounted in position for use over a table by means of the clamp 3. Meat is fed into the barrel through the inlet neck 4 and the screw 5 is turned by means of the handle 9 to feed the meat forwardly through the barrel to the front end thereof where it is forced through the openings in the inner plate. As the meat is forced through the openings in the inner plate, the blades 15 of the cutter 14 move across the openings and a slicing action takes place which cuts the meat into slices of a thickness substantially the same as the distance between the inner and outer plates. The sliced meat is forced forwardly and out through the opening 26 and the extensions 27 thereof. It will thus be seen that the meat will be delivered from the grinder in sliced form instead of in strings and that the meat when delivered will be very tender. It should also be noted that the outer plate serves as a guard to prevent the operator's fingers from being caught in the openings 25 or by the blades.

While it has been stated that the device is used for grinding meat, it will be obvious that it it not limited to such material.

Having thus described the invention, what is claimed is:

1. In a device of the character described, a barrel open at its front end, a feed screw rotatably mounted in said barrel and having a stub shaft at its front end, inner and outer plates mounted in the front end of said barrel and spaced from each other the inner plate being formed with openings spaced from each other circumferentially thereof and the outer plate having a central opening formed with extensions extending radially of the plate between openings of the inner plate, said stub shaft extending through the inner and outer plates, and cutting means carried by said stub shaft in contacting engagement with the inner face of the inner plate.

2. In a meat grinder including a barrel open at its front end, and a feed screw rotatably mounted in said barrel; an inner plate removably mounted in the front end of said barrel, an outer plate in predetermined spaced relation to the inner plate, means to prevent turning of the plates relative to each other, said plates being formed with staggered openings constituting outlets for material forced forwardly through the barrel by the feed screw, and cutting means at the front end of said feed screw engaging the inner face of said inner plate.

3. In a meat grinder including a barrel open at its front end, and a feed screw rotatably mounted in said barrel; an inner plate mounted in the front end of said barrel, an outstanding flange about margins of said inner plate formed with an internal annular seat, an outer plate removably mounted in the annular seat of said flange and held thereby in predetermined spaced relation to the inner plate, said plates being formed with staggered openings constituting outlets, and cutting means at the front end of said screw in cooperating relation to the inner plate.

4. In a device of the character described, a barrel open at its front end, a feed screw rotatably mounted in said barrel, an inner plate removably mounted at the front end of said barrel, said inner plate being formed with a forwardly projecting circumferential flange and with an annular shoulder surrounded by said flange, an outer plate fitting against said shoulder and surrounded by said flange, a securing ring carried by said barrel and having an inwardly extending portion engaging the flange and the outer plate to hold the plates in place, said shoulder maintaining the outer plate spaced forwardly from the inner plate, the inner plate having openings formed therein in spaced relation to each other circumferentially thereof, the outer plate being formed with a center opening having radial extensions located between openings of the inner plate, and cutting means mounted at the front end of said feed screw in engagement with the inner face of the inner plate and cooperating with marginal edges of the openings in the inner plate to slice material forced through the openings by the screw.

5. In a device of the character described, a barrel open at its front end, a feed screw rotatably mounted in said barrel, an inner plate removably mounted at the front end of said barrel, said inner plate being formed with a forwardly projecting circumferential flange and with an annular shoulder surrounded by the flange, an outer plate fitting against said shoulder and surrounded by said flange, said flange being formed with recesses, lugs extending from marginal portions of said outer plate and engaged in the recesses to hold the plates against rotary movement relative to each other, said inner plate having a plurality of openings formed therein in spaced relation to each other circumferentially thereof, the outer plate having a center opening formed with extensions extending radially of the outer plate between the openings of the inner plate, a securing ring carried by said barrel and provided with an inwardly extending flange overlying the lugs and the outer edge of the flange of the inner plate to firmly hold the plates in place, a stub shaft projecting forwardly from said screw through centers of said plates, and a cutter carried by said stub shaft between the screw and the inner plate and having sharpened blades extending radially of the inner plate and engaging the inner face thereof for cooperating with margins of the openings in the inner plate and slicing material as the material is forced forwardly by the feed screw and through the openings of the inner plate.

6. An attachment for a meat grinder comprising an inner plate and an outer plate, the inner plate being formed with a circumferentially extending outstanding flange recessed about its inner periphery to form a seat snugly receiving the outer plate and hold the outer plate in spaced relation to the inner plate, the inner plate being formed with openings spaced from each other circumferentially thereof, the outer plate being formed with a central opening having radial extensions located between the openings of the inner plate, and lugs extending from marginal portions of the outer plate and engaged in recesses formed in the flange of the inner plate to hold the outer plate against turning movement relative to the inner plate and maintain the extensions of the opening of the outer plate between the openings of the inner plate.

7. An attachment for a meat grinder comprising companion inner and outer plates detachably engaged with each other, means for holding the plates in predetermined spaced relation to each other, the inner plate being formed with openings spaced from each other circumferentially thereof, the outer plate being formed with a center opening having radial extensions of less width than the distance between openings of the inner plate, and means to hold the outer plate against turning movement relative to the inner plate and maintain the extensions of its center opening in position between openings of the inner plate.

MELVIN BURK.